US012793159B2

(12) United States Patent
Silver et al.

(10) Patent No.: US 12,793,159 B2
(45) Date of Patent: Nov. 10, 2026

(54) METHOD AND SYSTEM FOR ONE-DIMENSIONAL SIGNAL EXTRACTION FOR VARIOUS COMPUTER PROCESSORS

(71) Applicant: Cognex Corporation, Natick, MA (US)

(72) Inventors: William M. Silver, Nobleboro, ME (US); Da Teng, Ashland, MA (US)

(73) Assignee: Cognex Corporation, Natick, MA (US)

( * ) Notice: Subject to any disclaimer, the term of this patent is extended or adjusted under 35 U.S.C. 154(b) by 239 days.

(21) Appl. No.: 18/655,026

(22) Filed: May 3, 2024

(65) Prior Publication Data

US 2024/0370962 A1 Nov. 7, 2024

Related U.S. Application Data

(60) Provisional application No. 63/500,415, filed on May 5, 2023.

(51) Int. Cl.
*G06T 1/00* (2006.01)
*G06T 1/60* (2006.01)

(52) U.S. Cl.
CPC .............. *G06T 1/0007* (2013.01); *G06T 1/60* (2013.01)

(58) Field of Classification Search
None
See application file for complete search history.

(56) References Cited

U.S. PATENT DOCUMENTS

2013/0163876 A1* 6/2013 Silver .................. G06K 7/1413 382/190
2015/0363661 A1* 12/2015 Silver .................. G06K 7/1413 382/195

FOREIGN PATENT DOCUMENTS

EP 3 699 821 A1 8/2020
WO WO 2008/086498 A2 7/2008

OTHER PUBLICATIONS

International Search Report and Written Opinion mailed Jul. 25, 2024 for International Application No. PCT/US2024/027758.
Brifault et al., Data cache management on EPIC architecture: Optimizing memory access for image processing. ACM SIGARCH Computer Architecture News. Jun. 3, 2004;32(3):p. 35-42.

* cited by examiner

*Primary Examiner* — Kristy A Haupt
(74) *Attorney, Agent, or Firm* — Wolf, Greenfield & Sacks, P.C.

(57) ABSTRACT

Methods and systems for extracting a one-dimensional (1D) signal from a two-dimensional (2D) digital image along a projection line are provided herein. The methods and systems store the digital image in a memory hierarchy wherein non-blocking prefetch operations can fetch pixels from a main store to a data cache. A prefetch plan, pixel processing plan, and prefetch distance are selected responsive to the orientation of the projection line. The prefetch plan uses a first memory address order that is designed to be favorable for efficiently fetching pixels from the main store to the data cache for the given orientation. The pixel processing plan uses a second address order that is designed to be favorable for computing a 1D signal along the projection line. The pixel processing plan is used in coordination with the prefetch plan to compute the one-dimensional signal, so that pixels are fetched from the main store to the data cache in advance of being used by the pixel operations by an amount of time that is responsive to the prefetch distance.

20 Claims, 11 Drawing Sheets

```
typedef struct
{
  int firstPixel;
  int lastPixel;
}
RowPrefetchInfo;

unsigned char* rowAddress;

RowPrefetchInfo* rowInfo;

int cacheLineSize;

int pixelOffset = rowInfo->firstPixel;
while (pixelOffset < rowInfo->lastPixel)
{
  prefetch(rowAddress + pixelOffset);
  pixelOffset += cacheLineSize;
}

prefetch(rowAddress + rowInfo->lastPixel);
```

500
510
520
530
540
550

Fig 5

| Partial Rows | | |
|---|---|---|
| Number | 3 | |
| Row A | 2 | 3 |
| Row B | 1 | 5 |
| Row C | 0 | 6 |

760

| Base Cyclic Rows | | |
|---|---|---|
| Number | 3 | |
| Phase 0 | 0 | 8 |
| Phase 1 | 0 | 8 |
| Phase 2 | -1 | 7 |

770

| Active Cyclic Rows | | |
|---|---|---|
| Extra Advance | 0 | |
| Phase 0 | 0 | 8 |
| Phase 1 | 0 | 8 |
| Phase 2 | -1 | 7 |

780

| | |
|---|---|
| xRowUpdate | 2 |
| xCycleAdjust | -1 |

860

| Partial Rows | | |
|---|---|---|
| Number | 3 | |
| Row A | 2 | 3 |
| Row B | 1 | 5 |
| Row C | 0 | 6 |

870

| Base Cyclic Rows | | |
|---|---|---|
| Number | 3 | |
| Phase 0 | 0 | 8 |
| Phase 1 | 0 | 8 |
| Phase 2 | -1 | 7 |

880

| Active Cyclic Rows | | |
|---|---|---|
| Extra Advance | 2 | |
| Phase 2 | -1 | 7 |
| Phase 0 | -1 | 7 |
| Phase 1 | -1 | 7 |

890

| | |
|---|---|
| xRowUpdate | 2 |
| xCycleAdjust | -1 |

METHOD AND SYSTEM FOR ONE-DIMENSIONAL SIGNAL EXTRACTION FOR VARIOUS COMPUTER PROCESSORS

RELATED APPLICATION

This application claims priority to and the benefit of U.S. Provisional Application Ser. No. 63/500,415, titled "METHOD AND SYSTEM FOR ONE-DIMENSIONAL SIGNAL EXTRACTION FOR VARIOUS COMPUTE PROCESSORS," filed on May 5, 2023, which is herein incorporated by reference in its entirety.

TECHNICAL FIELD

The technical field relates generally to digital electronic methods and systems, including computer program products, for extracting a one-dimensional digital signal from a two-dimensional digital image.

BACKGROUND

In digital image processing applications it can be desirable to extract a one-dimensional (1D) signal along a line in a two-dimensional (2D) digital image. Such applications can include, for example, inspection, measurement, and guidance for electronics, semiconductor, and general manufacturing, and barcode and other symbology reading.

The term projection is sometimes used to refer to the act of extracting a one-dimensional signal along a line, herein called a projection line, in a two-dimensional image. The term is sometimes also applied to the 1D signal itself, and sometimes has other meanings in the field of digital image processing.

In some methods or systems the projection line is restricted to lie along rows, columns, or diagonals of a digital image (parallel or diagonal to the pixel grid of the digital image). In such cases a 1D signal can be extracted from pixel values that lie exactly on the projection line. The 1D signal can have samples that are one pixel apart for rows and columns, and $\sqrt{2}$ pixels apart for diagonals (assuming square pixels).

In other methods or systems where the projection line is parallel or diagonal to the grid, a 1D signal is extracted by summing or averaging pixel values perpendicular to the projection line. For example, if a projection lies along row 20 of a digital image, each sample of a 1D signal along that line can be the sum or average of pixel values along a portion of a column that includes rows 18, 19, 20, 21, and 22.

When a projection line does not lie in a parallel or diagonal direction, pixels that lie exactly on the line, or in a direction perpendicular to the line, are in general sparsely located or nearly nonexistent. In some methods or systems where the projection line is not restricted to lie along rows, columns, or diagonals, therefore, a 1D signal is extracted from a set of pixels that approximately follows the projection line. One example of such a method is the so-called Bresenham line following method, which typically makes one-pixel steps along rows, columns, or diagonals in such a manner that the pixels visited lie approximately along the projection line.

In another method, herein referred to as linear convolution, a 1D signal is extracted by convolving the digital image with a 2D filter kernel at positions chosen by a Bresenham line following method. The filter kernel is designed to provide summing or averaging roughly perpendicular to the projection line. The filter kernel can have uniform weights, or the weights can become smaller for pixels farther from the projection line.

In another method, herein called skewed projection, pixels in a parallelogram pattern are used to extract a 1D signal. The parallelogram has two sides that lie along rows of the image, and the other two sides are at some skew angle, generally not along columns. The parallelogram is thus comprised of a certain number of consecutive pixels from each of a certain number of consecutive rows, with the starting columns for the pixels of the rows offset to approximately follow the skew angle. The 1D signal is formed by summing or averaging in the skew direction.

In another method, herein referred to as nearest neighbor projection, a grid of points are chosen that lie at some spacing along a projection line, typically one pixel, and at some spacing perpendicular to the projection line, typically also one pixel. The image coordinates of those points are rounded to the nearest integer so that they fall on pixel coordinates, and the pixels so specified are used to extract the 1D signal by summing or averaging approximately (in the nearest neighbor sense) perpendicular to the projection line.

In other methods, herein called bi-linear interpolation and bi-cubic interpolation, a grid of points is chosen in a manner similar to that used for nearest neighbor projection. Instead of rounding a point's coordinates to integers, however, the coordinates are used to compute an interpolated pixel value. These interpolated values are used to extract the 1D signal by summing or averaging perpendicular to the projection line. Formulas for bi-linear and bi-cubic interpolation are well known in the art.

SUMMARY

The present disclosure is directed to digital electronic methods and systems for extracting a one-dimensional (1D) signal from a two-dimensional (2D) digital image along a projection line.

A 2D digital image can be received, for example, from a camera, scanner, or computer rendering. The image can comprise pixels arranged on a pixel grid. Each pixel can be a single value or a set of values such as a complex number or a vector including, for example, a color vector. Values can represent any type of information, for example, numbers or symbols, and can be encoded in various formats, such as binary integers or floating-point values.

The digital image can be stored using a memory hierarchy comprising a main store and a data cache, wherein non-blocking prefetch operations can fetch pixels from the main store to the data cache. The main store can be large enough to hold a digital image of useful size, but can be significantly slower than the digital processor used to compute the 1D signal, making pixel fetch time a significant bottleneck. The data cache can be smaller and faster than the main store, providing higher-speed access to a selected portion of the digital image. The data cache can have any number of levels of varying sizes and speeds. A non-blocking prefetch operation does not block the digital processor or the memory hierarchy from continuing to perform other operations while the prefetch operation is in progress, such as fetching pixels and using them to compute a 1D signal. Pixels can be fetched from the main store to the data cache in units called cache lines. The memory hierarchy can be any digital memory systems, or any memory system comprising a main store and a data cache that supports non-blocking prefetch operations.

Information describing the projection line can be received, from which can be obtained an orientation of the projection line, wherein the orientation can be one of a set of allowable orientations, the set of allowable orientations including orientations that are not parallel to the pixel grid and are not diagonal to the pixel grid. In some embodiments, the set of allowable orientations can comprise orientations with rational slope. In some embodiments, the set of allowable orientations can be predetermined.

A prefetch plan can be selected, responsive to the orientation, specifying a sequence of prefetch operations in a first address order, the sequence of prefetch operations comprising a sequence of rows. The first address order and the sequence of rows can be designed to be favorable for efficiently fetching pixels from the main store to the data cache for the given orientation. A row can occupy one or more adjacent cache lines or partial cache lines.

A pixel processing plan can be selected, responsive to the orientation, specifying a sequence of pixel operations in a second address order that is distinct from the first address order. The second address order can be designed to be favorable for computing a 1D signal along the projection line.

A prefetch distance can be selected, responsive to the orientation. A prefetch distance can include an amount of time, or other unit of work, for example, a number of loop iterations, between a prefetch operation that fetches pixels from the main store to the data cache, and the processor fetching those pixels from the data cache for use in computing the 1D signal.

The pixel processing plan can be used in coordination with the prefetch plan to compute the one-dimensional signal, comprising executing the sequence of prefetch operations to fetch pixels from the main store to the data cache in advance of being used by the pixel operations by an amount of time that is responsive to the prefetch distance.

In some embodiments, at least one of the prefetch plan, the pixel processing plan, and the prefetch distance can be precomputed and stored in a table memory.

In some embodiments, the pixel processing plan can specify a repeating sequence of pixel weight templates.

In some embodiments, the prefetch plan can comprise a first phase for initialization and a second phase performed cyclically.

In some embodiments, the sequence of rows can comprise an initial, possibly empty sequence of partial rows, and a cyclic sequence of complete rows. In some embodiments, the first phase for initialization can specify prefetching a partial row. In some embodiments, the second phase can specify prefetching a complete row.

In some embodiments, the prefetch distance can be a parametric function of the orientation. In some embodiments, the prefetch distance can be determined by measuring an execution time.

In some embodiments, a distinction can be made between orientations where no rows in the corresponding prefetch plan exceed the cache line size by more than one addressable unit of memory, and orientations where at least one row in the corresponding prefetch plan does exceed the cache line size by more than one addressable unit of memory. It is usually the case that the latter orientations are close to horizontal, and so these orientations are called near-horizontal, with the former and usually more numerous orientations called off-horizontal. In these embodiments, the prefetch plans for near-horizontal orientations can use a different style from those for off-horizontal orientations.

In some embodiments, the prefetch plan for a plurality of allowable orientations can specify prefetching only a first and a last pixel of each row. These orientations can include the off-horizontal, where fetching just the first and last pixel of each row can ensure that all cache lines containing some portion of the row, and no others, can be prefetched.

In some embodiments, the prefetch plan for near-horizontal orientations can specify prefetching three pixels of each row. In some embodiments, the prefetch plan for near-horizontal orientations can specify prefetching exactly three pixels of each row.

Some embodiments relate to an electronic apparatus for extracting from a two-dimensional image a one-dimensional signal along a projection line. The apparatus may include a memory hierarchy comprising a main store and a data cache, wherein the two-dimensional image comprises pixels arranged on a pixel grid and is stored in the memory hierarchy, and the pixels of the two-dimensional image are fetched from the main store to the data cache by non-blocking prefetch operations; and at least one processor configured to execute computer executable instructions to, wherein the computer executable instructions comprise instructions for: receiving information describing the projection line, the information including an orientation of the projection line, wherein the orientation is one of a set of allowable orientations, the set of allowable orientations including orientations that are not parallel to the pixel grid and are not diagonal to the pixel grid; selecting, responsive to the orientation, a prefetch plan specifying a sequence of prefetch operations in a first address order, the sequence of prefetch operations comprising a sequence of rows; selecting, responsive to the orientation, a pixel processing plan specifying a sequence of pixel operations in a second address order that is distinct from the first address order; selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

In some embodiments, at least one of the prefetch plan, the pixel processing plan, or the prefetch distance can be precomputed and stored in a table memory.

In some embodiments, the pixel processing plan can specify a repeating sequence of pixel weight templates.

In some embodiments, the prefetch plan comprises a first phase for initialization and a second phase performed cyclically.

In some embodiments, the first phase can specify prefetching a partial row.

In some embodiments, the second phase can specify prefetching a complete row.

In some embodiments, the prefetch distance can be a parametric function of the orientation.

In some embodiments, the prefetch distance can be determined by measuring an execution time of the pixel processing plan.

In some embodiments, the prefetch plan for a plurality of allowable orientations can specify prefetching only a first and a last pixel of each row.

In some embodiments, the prefetch plan for near-horizontal orientations can specify prefetching three pixels of each row.

In some embodiments, the prefetch plan for near-horizontal orientations can specify prefetching exactly three pixels of each row.

Some embodiments relate to a non-transitory computer-readable medium storing computer executable instructions configured to, when executed by at least one processor, perform a method for extracting from a two-dimensional image a one-dimensional signal along a projection line. The method can include accessing the two-dimensional image, which comprises pixels arranged on a pixel grid; storing the two-dimensional image using a memory hierarchy comprising a main store and a data cache, wherein non-blocking prefetch operations are configured to fetch pixels from the main store to the data cache; receiving information describing the projection line, the information including an orientation of the projection line, wherein the orientation is one of a set of allowable orientations, the set of allowable orientations including orientations that are not parallel to the pixel grid and are not diagonal to the pixel grid; selecting, responsive to the orientation, a prefetch plan specifying a sequence of prefetch operations in a first address order, the sequence of prefetch operations comprising a sequence of rows; selecting, responsive to the orientation, a pixel processing plan specifying a sequence of pixel operations in a second address order that is distinct from the first address order; selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

The foregoing and other aspects, features, and advantages of the present digital electronic methods and systems, as well as the digital electronic methods and systems themselves, will be more fully understood from the following description of various embodiments, when read together with the accompanying drawings.

FIG. 5 illustrates an exemplary procedure in the C programming language for prefetching a row of pixels.

DETAILED DESCRIPTION

Figure 1:
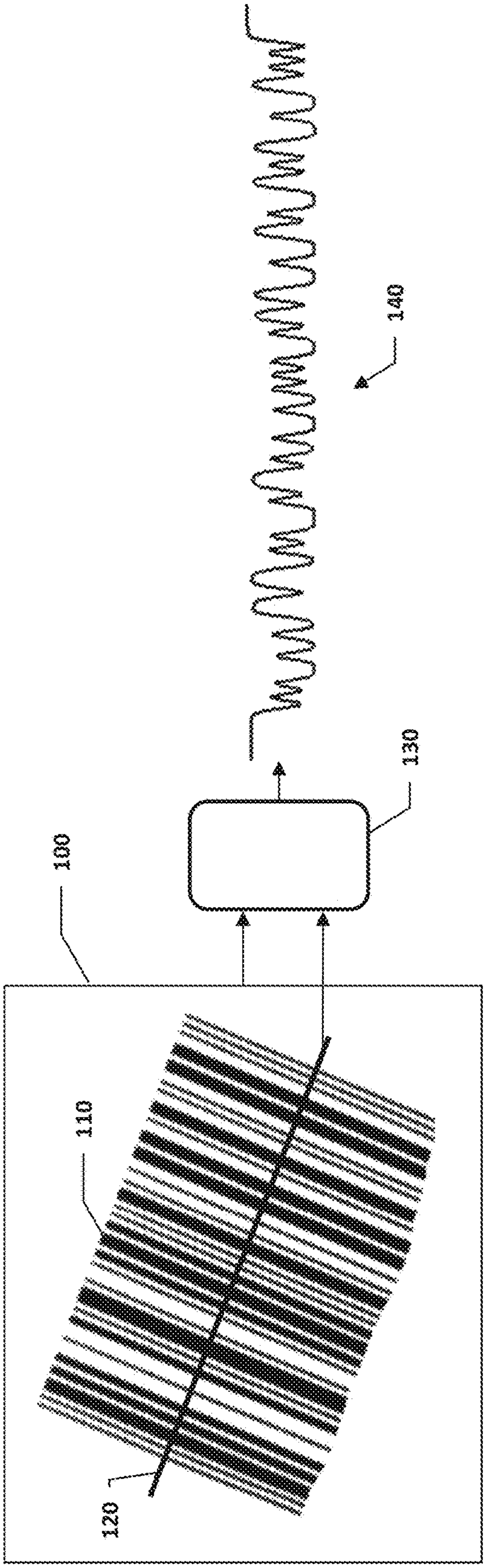
FIG. 1 is a schematic illustration of the operation of an exemplary system for one-dimensional signal extraction.

In the following detailed description of the illustrative embodiments, reference is made to the accompanying drawings which form a part hereof, and in which are shown by way of illustration specific embodiments in which the methods or systems described herein may be practiced. It is to be understood that other embodiments may be utilized and structural changes may be made without departing from the scope of the disclosure.

It can be desirable to reduce the time needed to extract a one-dimensional (1D) signal from a two-dimensional (2D) image on a given digital processing device, or equivalently to increase the speed of operation. Notably, a significant portion of the time needed for 1D signal extraction, regardless of the method or system employed, can be consumed by the time needed to fetch image pixels from memory. Memories that are large enough to hold a useful digital image, for example, those commonly known as dynamic random access memory (DRAM), are typically significantly slower than the processor in use, making the pixel fetch time a significant bottleneck.

One method to reduce this bottleneck may be to fetch pixels from the larger, slower memory to a smaller but faster memory, in advance of those pixels being needed by the processor, so that the pixel fetching time can be overlapped with other operations, for example, computing and outputting the 1D signal. This overlap partially hides the pixel fetching time and thereby reduces the overall signal extraction time. Since the smaller, faster memory can be too small to hold the entire image, it is important to carefully select which pixels to fetch, when to fetch them, and when to replace previously fetch pixels that are no longer needed.

For example, a repeating sequence of pixel weight templates can be placed at a sequence of relative positions in the digital image. Such use of pixel weight templates can provide high photometric and geometric accuracy, while allowing independent control of blur in the direction of, and normal to, the projection line. The time needed to fetch pixels from memory can substantially affect speed of operation. A direct memory access controller (DMAC) can be used to fetch pixels to a small, fast scratchpad memory for access by a digital signal processor. The DMAC can be used to overlap pixel fetching with computation for 1D signal extraction, suitable for use on devices, such as digital signal processors, that are equipped with DMAC. An example of producing a one-dimensional signal is shown in U.S. Pat. No. 9,122,952, hereinafter the '952 patent, which is incorporated herein by reference in its entirety. However, many contemporary digital processors that would be desirable for 1D signal extraction do not have a DMAC to overlap pixel fetching with computation for 1D signal extraction.

Many contemporary digital processors employ memory hierarchies of various designs, which can comprise a larger, slower memory in collaboration with smaller, faster memories called data cache levels, to provide the appearance of a large memory with some of the speed benefit of the smaller memories. These systems can include the ability to perform prefetch operations, which can fetch data from slower to faster memories in advance of that data being needed by the processor, so that pixel fetching can be overlapped with the processor performing other computations. The effectiveness of prefetch operations to achieve a speedup can be critically dependent on the order and timing of those operations in relation to those being performed by the processor.

Prefetch operations can be initiated by, for example, under program control by the processor (software prefetch), and automatically by hardware prefetch engines. For an example of software prefetch, some compilers can recognize certain simple memory access patterns in source code and insert prefetch instructions into object code. Hardware prefetch engines can attempt to deduce the order in which the processor is accessing memory as the program runs.

The compiler, or hardware prefetch engine, can attempt to predict which portions of slower memory to prefetch and when to do so. These approaches are limited by being general-purpose algorithms that do not take advantage of the specific needs and properties of 1D signal extraction, which include complex memory access patterns that are highly dependent on the orientation of the projection line, and where a desirable order of pixels to prefetch can be very different from a desirable order of pixels to process for signal extraction.

The present disclosure provides methods and systems for creating, selecting, and using prefetch plans that employ direct knowledge of the memory access patterns that are specific to a given projection line orientation. The present disclosure further provides methods and systems for using these prefetch plans in coordination with pixel processing, so as to control the timing between prefetch and use of pixels to achieve the desired overlap. In some embodiments, some or all of the plans for a set of allowable orientations can be precomputed and stored in a table memory.

FIG. 1 is a schematic illustration of the operation of an exemplary system for one-dimensional signal extraction. A two-dimensional (2D) digital image 100 is received, for example from a camera, scanner, or computer rendering. The digital image 100 may contain features, such as for example barcode 110. Information describing a projection line 120 is received, along which it is considered desirable to extract a one-dimensional digital signal, for example signal 140 which corresponds to example feature barcode 110. A digital electronic system 130 extracts signal 140 from image 100 along projection line 120.

One-dimensional digital signal 140 generally comprises a sequence of values, often called samples or projection bins. A value can be a single number or a set of numbers such as a complex number or a vector, for example a color vector. The numbers can be encoded in various formats, such as binary integers or floating-point values.

The orientation of projection line 120 relative to digital image 100 is one of a set of allowable orientations, which can include all orientations that can be encoded in the received information describing projection line 120, and can further be restricted to a range, such as 0-45°; to orientations with rational slopes; to orientations selected as being favorable according to some metric; to orientations selected at random; or to any other suitable restriction or combination of restrictions.

It is noted that while a barcode is used as an example in places herein, it is well known that extracting a 1D signal along a projection line in a digital image is useful for a variety of applications, for example in the manufacture of printed circuit boards, solar panels, and integrated circuits. One such application in integrated circuit manufacturing is locating leads on lead frames during wire bonding. Thus the barcode examples herein are by way of illustration only, and are not to be considered limiting.

Figure 2:
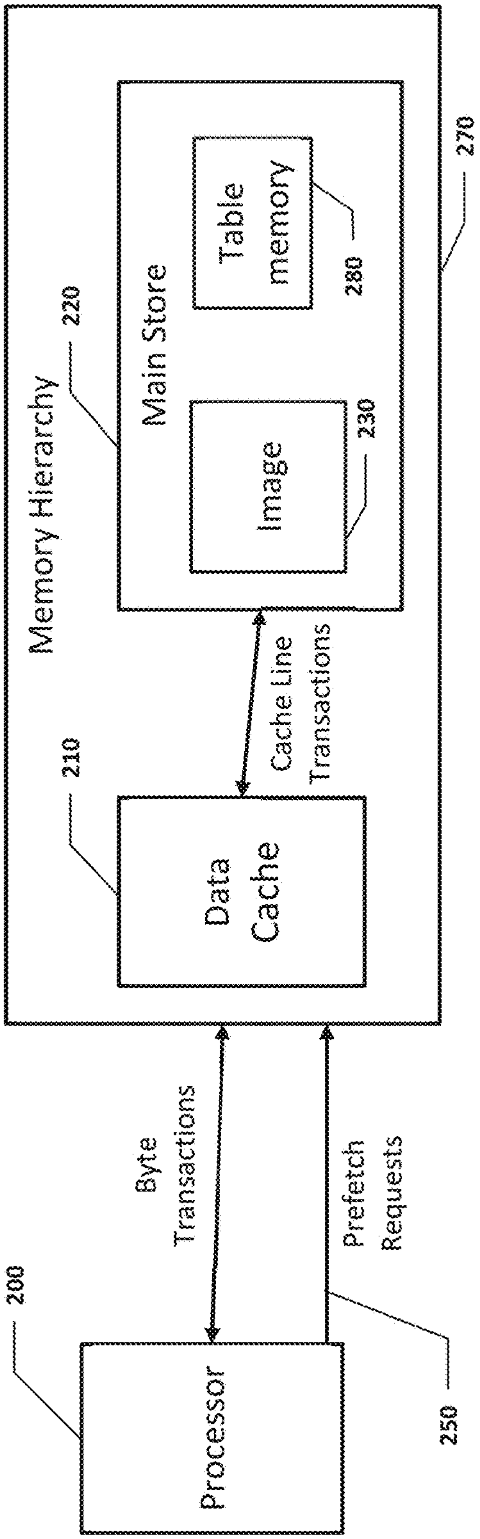
FIG. 2 illustrates a portion of the exemplary system of FIG. 1, showing in more detail elements generally relevant to the present disclosure.

FIG. 2 illustrates a portion of exemplary digital electronic system 130, showing the elements generally relevant to the present disclosure.

In the illustrated example, a received digital image 230 is stored in main store memory 220, which is an element of memory hierarchy 270. Image 230 is logically a 2D array of pixels, each of which can be identified by an (x, y) integer coordinate, and by an address in memory 220 that can be derived from the (x, y) coordinate. Although a byte-addressable memory system with one-byte pixels is illustrated, it should be appreciated that different memory storage units or pixel sizes could be used. Each pixel can be a single value or a set of values such as a complex number or a vector including, for example, a color vector. Values can represent any type of information, for example numbers or symbols, and can be encoded in various formats, such as binary integers or floating-point values.

Main store memory 220 also can hold table memory 280, which can be used to store pixel processing plans and prefetch plans, as further described below.

In the examples illustrated herein, images are shown with respective to coordinates (x, y). In some embodiments:

- The address of pixels increases by pixel size in the +x direction.
- A set of pixels with constant y coordinate is called a row, or said to lie along a row.
- The address of pixels increases by a row pitch in the +y direction, where row pitch can vary from image to image but is constant within an image. Row pitch can be positive or negative.
- The +x direction is horizontal from left to right in drawings.
- The +y direction is vertical from top to bottom in drawings.

Although an image storage scheme with certain conventions is described above, it should be appreciated that other conventions can be adopted. For example, an image storage scheme may not have a constant, image-dependent row pitch.

Memory hierarchy 270 can include a larger, slower memory, such as main store memory 220, in collaboration with smaller, faster memories, such as data cache 210. The smaller, faster memories can be referred to as cache levels, and can provide the appearance of a large memory with some of the speed benefit of the smaller memories. The smallest and fastest such memory is generally called level 1 (L1) cache. The speed performance of this arrangement depends critically on the order in which pixels are fetched, and on the ability to overlap processing of pixels with fetching ones that will be needed soon.

Data cache 210 of memory hierarchy 270 can be any suitable arrangement of any number of cache levels. For purposes of the descriptions herein, the number of levels does not matter. The methods and systems illustrated and described herein can be used as desired to fetch pixels from memory 220 to any or all levels of data cache 210. Cache levels can be dedicated to processor 200 or shared with other processors, for example in so-called multi-core configurations.

In the illustrated example, the address space of memory hierarchy 270 is logically a byte array, organized internally as an array of blocks of memory, which may be referred to as cache lines and are generally a power of two in size, for example 64 bytes. Different cache levels can have cache lines of different sizes, although this is not typical.

Processor 200 operates so as to, among other activities, fetch pixels from image 230 and compute signal 140. To fetch a pixel, processor 200 executes transactions with memory hierarchy 270 using byte addresses. Hierarchy 270 performs methods for fetching data, which can involve:

- identifying the cache line containing the requested bytes;
- determining whether the cache line is already in L1 cache, called an L1 hit, or not, called an L1 miss;
- if an L1 miss, fetching the cache line from a higher level, or from main store memory 220, to L1 cache, possibly evicting another cache line to make room; and
- providing the requested bytes from L1 cache to processor 200.

Memory hierarchy 270 supports non-blocking prefetch operations, which can respond to prefetch requests 250 by processor 200 without blocking processer 200 and/or hierarchy 270 from continuing to perform other operations. Prefetch requests 250 specify the address of a unit of memory, for example a byte, which hierarchy 270 can consider a hint that the specified unit of memory will be needed soon by processor 200. Prefetch requests 250 can also specify a cache level target. Hierarchy 270 can respond to the prefetch request by performing a non-blocking prefetch operation, which fetches to the target cache level, or default level if no target is provided, the cache line containing the specified memory unit, from a higher level, or from main store memory 220. The non-blocking prefetch operation does not block processor 200 or hierarchy 270 from continuing to perform other operations while the prefetch operation is in progress, such as fetching pixels and using them to compute signal 140. In this way the time needed to fetch pixels from slower memories can be overlapped with processing previously fetched pixels, which has the potential to significantly speed up the overall signal extraction. The effectiveness of prefetch operations to achieve a speedup is critically dependent on the order and timing of pixel and prefetch addresses.

Processor 200 can be any suitable digital electronic processor that can issue prefetch requests, for example the 64-bit microprocessors designed by Intel and ARM and manufactured and sold by various vendors. Processor 200 can be of a design including but not limited to those commonly called a central processing unit (CPU), digital signal processor (DSP), or graphics processing unit (GPU). It can also be an application-specific integrated circuit (ASIC) or field-programmable gate array (FPGA) where such devices communicate with memory and can issue prefetch requests. Prefetch requests can arise from machine instructions and/or hardwired logic executed by processor 200.

Figure 3:
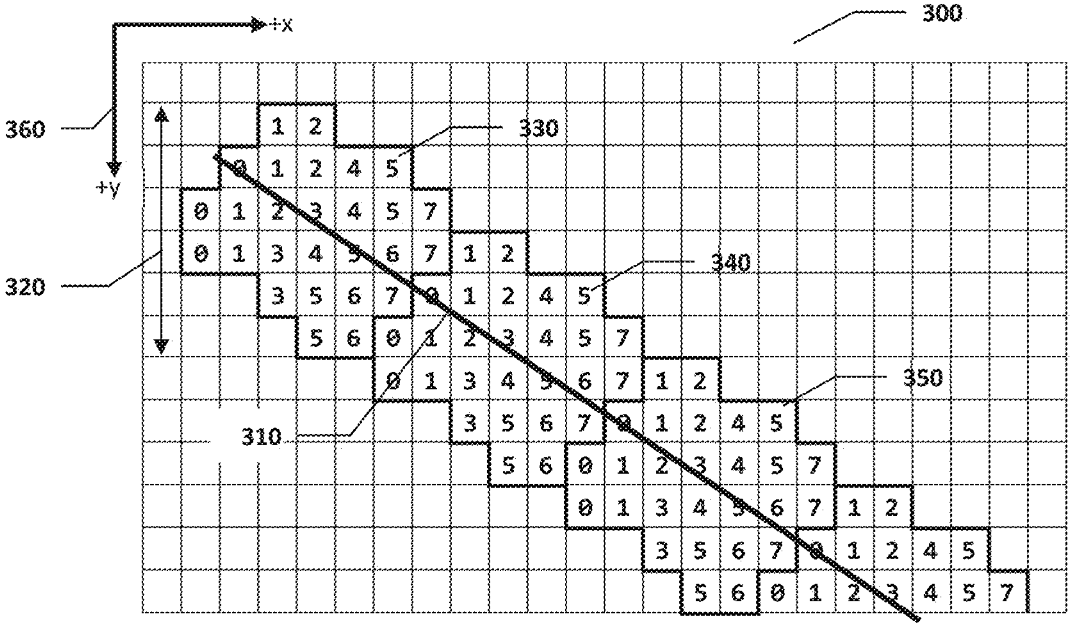
FIG. 3 illustrates an exemplary pixel processing plan according to a signal extraction method, showing a slope 3/5 projection line, a sequence of modules, and an illustrative pixel access order for signal extraction.

FIG. 3 illustrates an exemplary pixel processing plan according to a signal extraction method. A pixel processing plan can specify a sequence of pixel operations, which in turn can specify a memory address order, and which can be selected in response to the orientation of the projection line.

Pixel grid 300 can correspond to a portion of a received digital image, for example, image 230. The above-described pixel coordinate direction conventions are shown by coordinate axes 360. The pixel values are not shown.

Information describing example projection line 310 can be received, either directly or indirectly. From this information the orientation of projection line 310 is obtained, in this example corresponding to slope $\Delta y/\Delta x=3/5$ (approximately 31 degrees from horizontal). In this and other examples herein, slope has the usual meaning of a ratio between a displacement in the y direction ($\Delta y$) and a displacement in the x direction ($\Delta x$). This orientation is one of a set of allowable orientations, the set including orientations that are not parallel or diagonal to pixel grid 300. For example, an exemplary embodiment of a method comprises 171 allowable orientations in the range 0-90°, each such orientation having rational slope.

One notable aspect of the present disclosure is the memory address order in which pixels are fetched from memory hierarchy 270. For signal computation purposes, it can be desirable that the order generally follows the direction of the projection line, as discrete grid geometry allows.

FIG. 3 shows a pixel processing plan characterized by a repeating pattern, which may be referred to as a module, placed in a sequence of positions that interlock and follow projection line 310 as shown. The module placed at a particular position is a module cycle of the sequence, for example first module cycle 330, second module cycle 340, and third module cycle 350. In this example each cycle is displaced from the previous by $\Delta x=5$ pixels in the x direction and $\Delta y=3$ pixels in the y direction, so that the cycles follow projection line 310.

The example pattern for the module of FIG. 3 can be seen at each cycle, and comprises 8 disjoint sets of relative pixel positions called slices, labelled 0-7 in the figure. A relative pixel position at a particular module cycle can be used to obtain a memory address at which to fetch the pixel. For each module cycle, pixels are fetched in slice order, in this example from 0 to 7 and then continuing with slice 0 of the next cycle. The number of slices is the module period, 8 in the example of FIG. 3. Within a given slice, pixel access order is immaterial and can be determined by other criteria. By accessing pixels in an order determined by module cycles and slices, projection line 310 can be followed with pixel grid resolution.

Although an arrangement is used by way of example in FIG. 3, it can be seen that any sequence of pixel operations that follows a projection line in some cyclic pattern can be used within the scope of this invention. For the embodiments of the present disclosure that use pixel processing plans, the pixel processing plan can use a module cycle and slice order.

The extent of a module in the y direction is called the module height, for example extent 320 shows that for the example of FIG. 3, the module height is 6.

Figure 4:
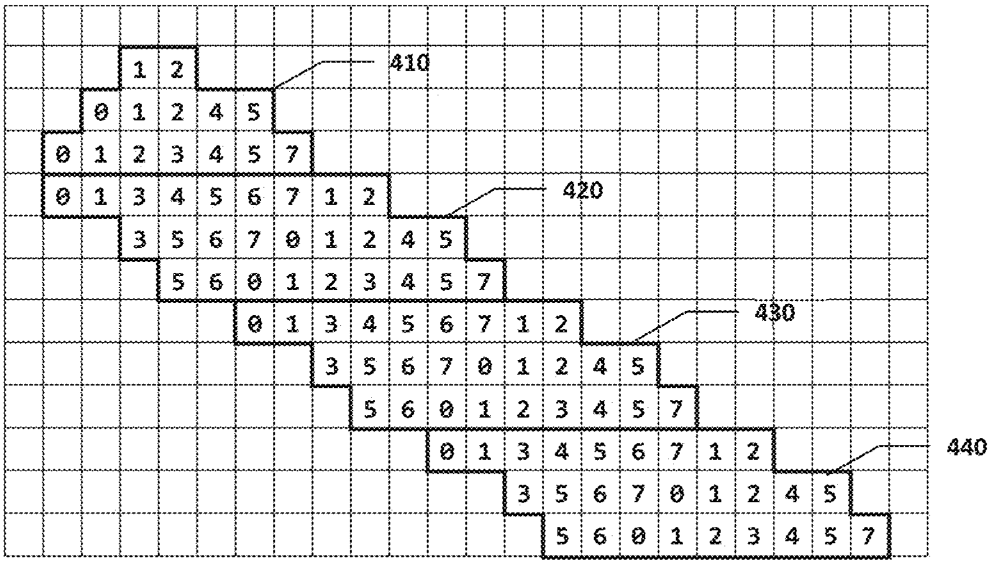
FIG. 4 illustrates the exemplary pixel processing plan of FIG. 3, showing partial rows and row cycles according to an illustrative embodiment of the present disclosure.

FIG. 4 shows the same slice pattern as FIG. 3, but organized by image rows instead of module cycles to show how the pixels look to the memory hierarchy. There are three partial rows 410 at beginning of the projection line, and then a repeating sequence of complete rows also called row cycles, such as example row cycles 420, 430, and 440. Each row cycle has 3 phases, which follows from the module's $\Delta y=3$, in general called the row period. Row phases can span many slices and multiple module cycles. The row period can be an integer, e.g., 3. A row cycle can be a set of rows, which can repeat over multiple cycles. The row period can be the length of a row cycle.

For each module cycle, some of the pixels are fetched in some order from a number of rows equal to the row period Δy, where new rows are rows that contain pixels that were not needed for the previous module cycle. If a module's height is h, there must be h−Δy rows of overlap between adjacent module cycles. Since there is no prior module cycle for first module cycle 330, there will be h−Δy=3 partial rows 410 that have no cycle with which to overlap.

The disclosure recognizes that it can be desirable to prefetch rows at some point in time prior to their use by processor 200, so that the pixels are likely to reside in L1 cache when fetched in the address order specified by the pixel processing plan. The amount of time or other unit of work, for example number of loop iterations, between prefetch and use is often called the prefetch distance. A prefetch plan specifies a sequence of prefetch addresses and parameters to control prefetch distance, and can be selected in response to the orientation of the projection line, as will be seen in subsequent figures.

The disclosure further recognizes that a desirable address order that follows a projection line for pixel processing can be distinct from a desirable address order for prefetching row phases, that a desirable pixel processing cycle period can be different from a desirable row prefetch period, that it can be desirable to coordinate pixel processing and row prefetching to keep a suitable prefetch distance, and that it can be desirable to select the pixel processing and prefetch plans responsive to the orientation of the projection line.

Consequently the descriptions and illustrations herein provide methods and systems for creating, selecting, and using prefetch plans in coordination with pixel processing plans, where the plans can be created and selected responsive to the orientation of the projection line. In some embodiments some or all of the plans for the set of allowable orientations can be precomputed and stored in table memory 280.

A given row to be prefetched will reside in one or more cache lines. It is desirable that all cache lines containing some portion of the row be prefetched, and that no other cache lines be prefetched. A prefetch plan, whether or not precomputed, may not know the location of cache lines because such plans may contain only relative pixel locations that can be applied to an image whose size, row pitch, and location in memory are not known in advance.

In some embodiments, once a particular image is specified suitable logic can determine which cache lines to prefetch for each row as the prefetch plan is used. In some embodiments, particularly those using software instructions, it can be desirable to avoid this logic because it can introduce performance-degrading overhead due to the need for additional instructions, including expensive conditional branches.

FIG. 5 shows computer source code in the C programming language for an exemplary embodiment wherein rows are prefetched in a manner that prefetches all cache lines containing some portion of the row, and no others, without requiring knowledge of the location of cache line boundaries.

A prefetch plan for a given orientation can contain information about the rows to be prefetched, for example row prefetch information structure 500, which holds the offset of the first and last byte of the row relative to row address 510. Exemplary procedures for obtaining row address 510 are given below. Although the offsets in row prefetch information structure 500 are byte offsets, and row address 510 is a byte address because example memory hierarchy 270 uses byte addresses, it should be appreciated that pixels may not be bytes. For larger pixels, byte offsets and addresses can be obtained.

Row information pointer 520 holds the address of an instance of row prefetch information structure 500 to be used to prefetch a particular row, the value of which can be obtained from the prefetch plan. Cache line size 530 is a property of the memory hierarchy is in use.

Prefetch loop 540 prefetches zero or more cache lines, starting at the one containing the first pixel of the row and stepping by cache line size 530 to subsequent cache lines, stopping when the last pixel is reached or exceeded. Note that prefetch loop 540 prefetches zero cache lines only when the first and last pixel offsets are equal, meaning that the row size is one pixel.

After prefetch loop 540 is finished, last pixel prefetch operation 550 prefetches the cache line containing the last pixel of the row. Since the cache line boundaries are not known, the cache line containing the last pixel of the row may or may not have already been prefetched by the last iteration of prefetch loop 540. Last pixel prefetch operation 550 may therefore be unnecessary, but can be ignored by memory hierarchy 270 because the cache line has already been prefetched. In these embodiments, executing an unnecessary and ignored prefetch operation can be less expensive than the logic that would be required to avoid it.

It will be appreciated that many variations on the exemplary embodiment of FIG. 5 can be used within the scope of the disclosure, whether or not using computer code, in any suitable programming language, and whether equivalent to FIG. 5 or not.

In some embodiments a distinction is made between orientations where no rows in the corresponding prefetch plan exceed the cache line size by more than one addressable unit of memory, and orientations where at least one row in the corresponding prefetch plan exceeds the cache line size by more than one addressable unit of memory. It is usually the case that the latter orientations are close to horizontal (substantially in the x coordinate direction), and so these orientations are called near-horizontal, with the former and usually more numerous orientations called off-horizontal. In these embodiments, the prefetch plans for near-horizontal orientations can use a different style from those for off-horizontal orientations.

For off-horizontal orientations prefetch loop 540 will execute one iteration (or in rare cases zero iterations). Only two prefetch operations are needed, one for the first pixel of a row and one for the last pixel, to guarantee that all cache lines containing some portion of the row, and no others, are prefetched, with the possibility that one unnecessary prefetch operation may be executed and ignored. With embodiments that distinguish near- and off-horizontal orientations, off-horizontal rows can be prefetched without any potentially expensive loop control logic-just unconditionally prefetch at the first and last pixel addresses. Options for prefetching rows at near-horizontal orientations are described below in relation to FIG. 12.

Figure 6:
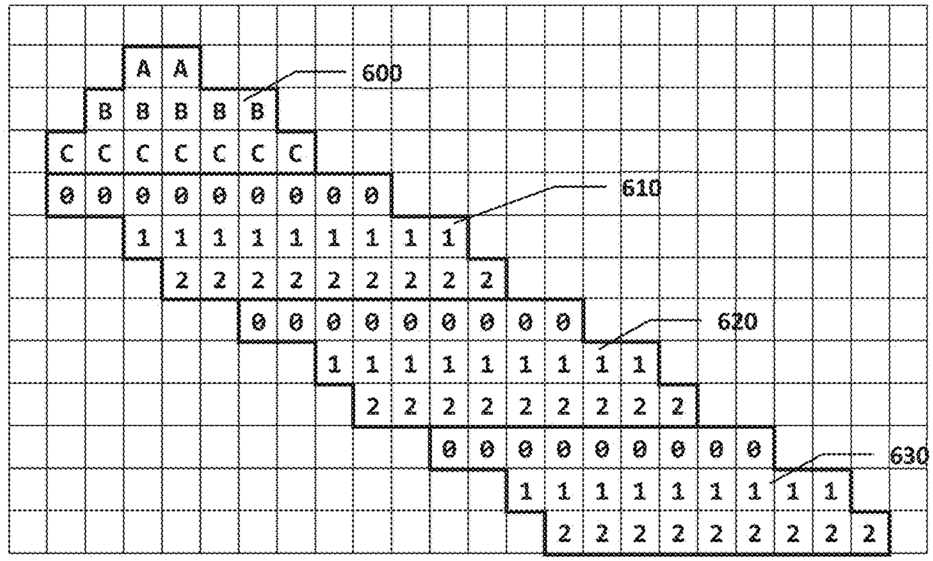
FIG. 6 illustrates exemplary partial rows and row cycle phases for the slope 3/5 projection line of FIGS. 3 and 4.

FIG. 6 shows the same pixel locations as FIGS. 3 and 4, but with the partial rows 600 and the Δy=3 row phases of row cycles 610, 620, and 630 made explicit. The pixel locations for partial rows 600 are indicated with the letters A, B, and C, while the pixel locations of the complete row cycles are indicated by phase numbers. Following the conventions used herein, the pixels of a row are at adjacent addresses, which are located in a much smaller number of cache lines. Each of the Δy=3 row phases are no larger than a cache line, so this exemplary slope 3/5 orientation is off-horizontal.

In some embodiments, a prefetch plan comprises an initialization phase and a cyclic phase. The initialization phase prefetches the partial rows, and then zero or more row cycle phases called the extra advance rows. Once the initialization phase is complete, the cyclic pixel processing plan is used in coordination with the cyclic phase of the prefetch plan, which continues at the row cycle and phase where the extra advance left off, to compute the one-dimensional signal. The prefetch distance is thereby responsive to the number of extra advance rows, which is responsive to the orientation of the projection line.

Figure 7:
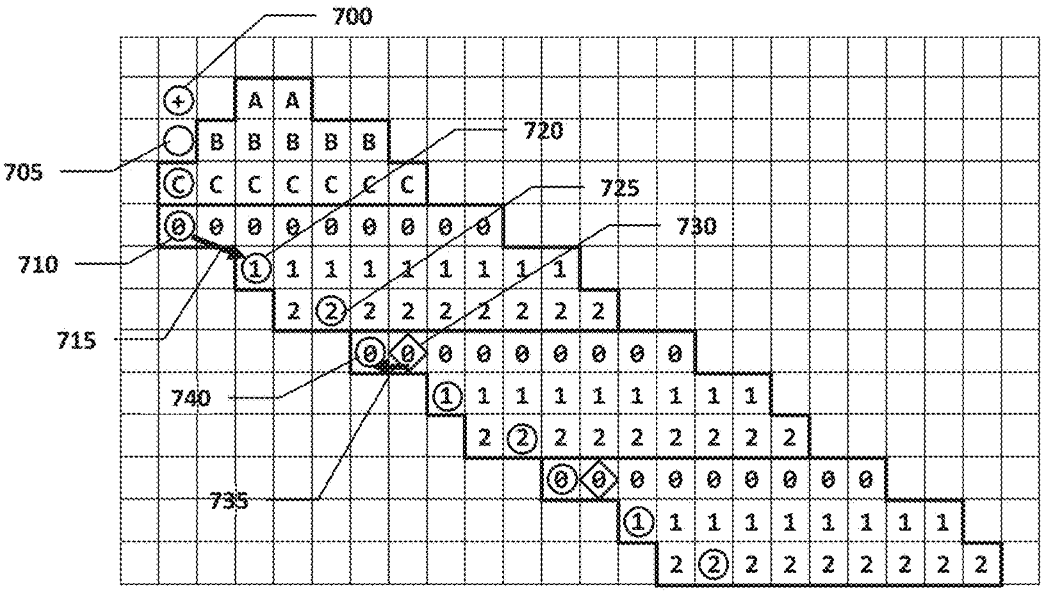
FIG. 7 illustrates an exemplary prefetch plan for the slope 3/5 projection line.

FIG. 7 shows an exemplary prefetch plan corresponding to the rows of FIG. 6 and with a prefetch distance responsive to zero extra advance rows. From information describing the projection line, a starting pixel position 700 is determined, and from that position a corresponding row address is obtained. The row address is updated after each row is prefetched, and is shown for each row by a circle inside a grid location.

The prefetch plan includes partial row information 750, which gives the number of partial rows (h−Δy=3) and the offsets of the first and last pixel of each partial row relative to the updating row address. In the example partial row A runs from offset 2 to offset 3, partial row B from 1 to 5, and partial row C from 0 to 6. After each partial row is prefetched, the row address is updated by the row pitch, for example to grid location 705 for partial row B. After all partial rows are prefetched, the row address will be at grid location 710. Since in this example there are zero extra advance rows, the cyclic phase begins with the row address at grid location 710.

Figure 13:
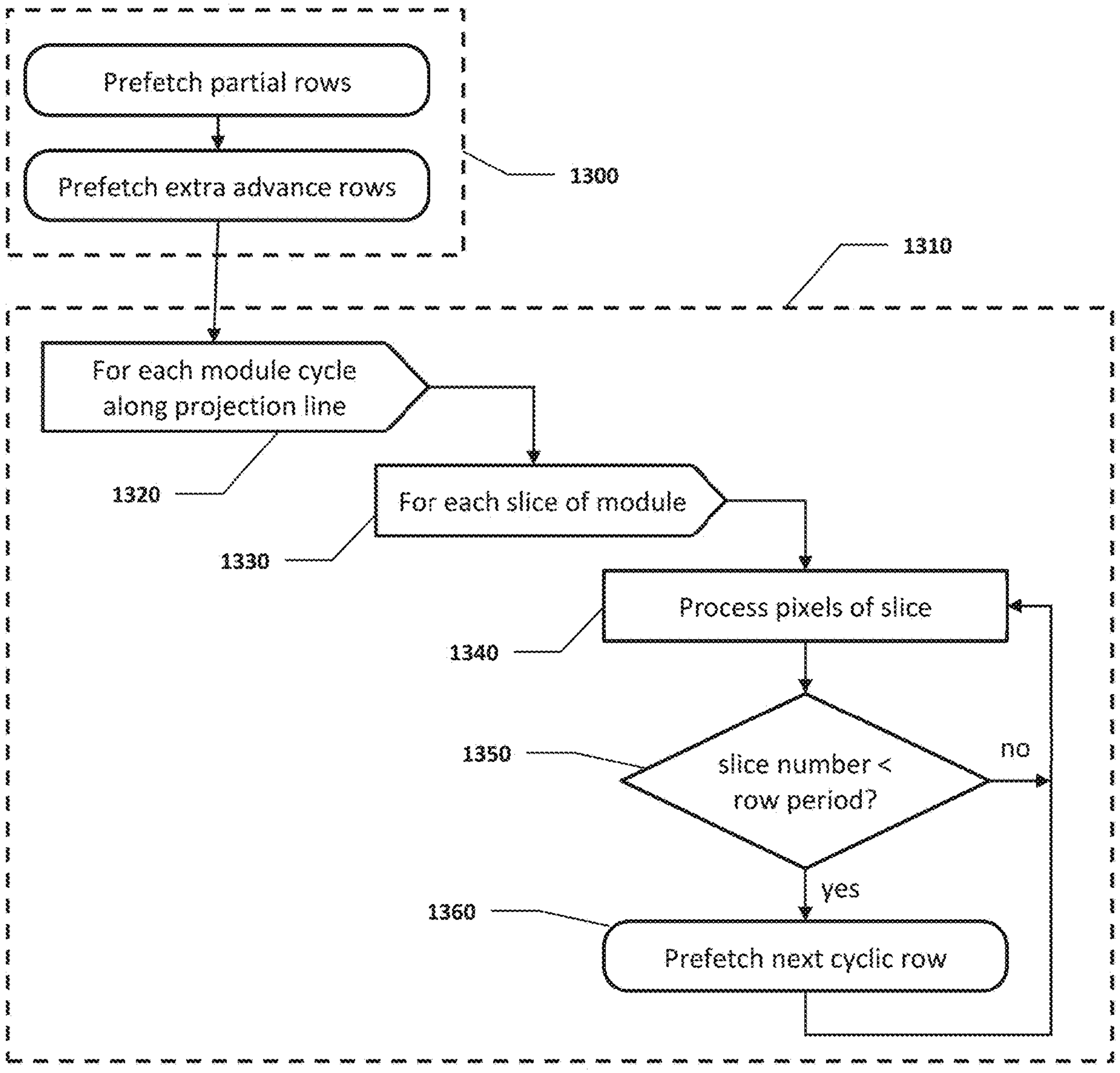
FIG. 13 is an exemplary flowchart illustrating a procedure for using a pixel processing plan in coordination with a prefetch plan.

To coordinate the pixel processing plan and the prefetch plan so as to keep a suitable prefetch distance, the exemplary period 8 pixel processing plan and period Δy=3 prefetch plan can be synchronized. For an example with very low logic overhead, the first Δy=3 slices of each module cycle can be interleaved with the 3 row phases, with the remaining slices then executed alone. FIG. 13 and the below description provides more details on how this coordination can be achieved. It is understood that any suitable scheme for interleaving or otherwise synchronizing the pixel plan and prefetch cycles can be used. The effective prefetch distance can vary slightly over a module cycle, and can stay within a suitable range.

In the cyclic phase of the prefetch plan, the row address can be updated after each row by a cyclic row update amount 715, for example to update the row address from grid location 710 to grid location 720, grid location 725, and grid location 730 for the phase 0 row of the next cycle. The cyclic row update amount 715 for this exemplary prefetch plan is the sum of the row pitch and an amount xRowUpdate given in prefetch plan parameters 780, in this example 2. This makes the row address update by 1 in y and xRowUpdate in x after each row, approximately following the orientation of the projection line while keeping the row update overhead low because the cyclic row update is constant for each prefetch plan. Note that the use of xRowUpdate adds no overhead because it is combined with the row pitch.

To preserve the cyclic nature of the pixel processing and prefetch plans, it is desirable that the row addresses be at the same relative row positions for every row cycle. To accomplish this, xCycleAdjust 735, whose exemplary value −1 is given in prefetch plan parameters 780, is added to the row address after each row cycle. This moves the row address from example grid location 730 after the end of the first cycle, to grid location 740 for the start of the second cycle, keeping the row addresses at the same relative row positions for every row cycle. It can be seen that to serve this function, $$xCycleAdjust = \Delta x - (\text{row period}) * xRowUpdate \tag{1}$$

in this example xCycleAdjust=5−3*2=−1.

The use of xCycleAdjust incurs very low overhead because it is used only once per row cycle. The grid positions that are moved by xCycleAdjust 735 at the end of each cycle are indicated with diamonds in the example of FIG. 7 and subsequent figures.

For the exemplary prefetch plan of FIG. 7, base cyclic row information 760 gives the offsets of the first and last pixel of each cyclic row phase relative to the updating row address, for the case where there are zero extra advance rows. Active cyclic row information 770 includes an adjustable extra advance amount, and the offsets of the first and last pixel of each cyclic row phase relative to the updating row address, as adjusted from base cyclic row information 760 to reflect the adjustable extra advance amount, as further described below.

The extra advance amount can be adjusted separately for each prefetch plan to achieve a desired prefetch distance responsive to the orientation of the projection line. When using a prefetch plan, the adjusted offsets in active cyclic row information 770 can be employed to obtain the correct prefetch addresses.

It should be noted that the use of a non-zero xRow Update in some embodiments to approximately follow the projection line within each cycle keeps the first and last pixel offsets small, allowing a potentially smaller memory footprint for the prefetch plans that can be stored in table memory 280 because, for example, one-byte offsets can be stored. In other embodiments xRowUpdate is not used (effectively always 0), or other values are used, with appropriate adjustments made to the offsets in base cyclic row information 760 and active cyclic row information 770.

In the exemplary embodiments herein described, when the extra advance amount is an integer multiple of the row period Δy as it is in FIG. 7, the offsets in active cyclic row information 770 are the same as in base cyclic row information 760. When the extra advance amount is not an integer multiple of the row period, some adjustments can be made to the offsets in active cyclic row information, as will be seen in FIG. 8, which illustrates an alternative exemplary prefetch plan corresponding to the rows of FIG. 6, with a prefetch distance responsive to 2 extra advance rows.

Figure 8:
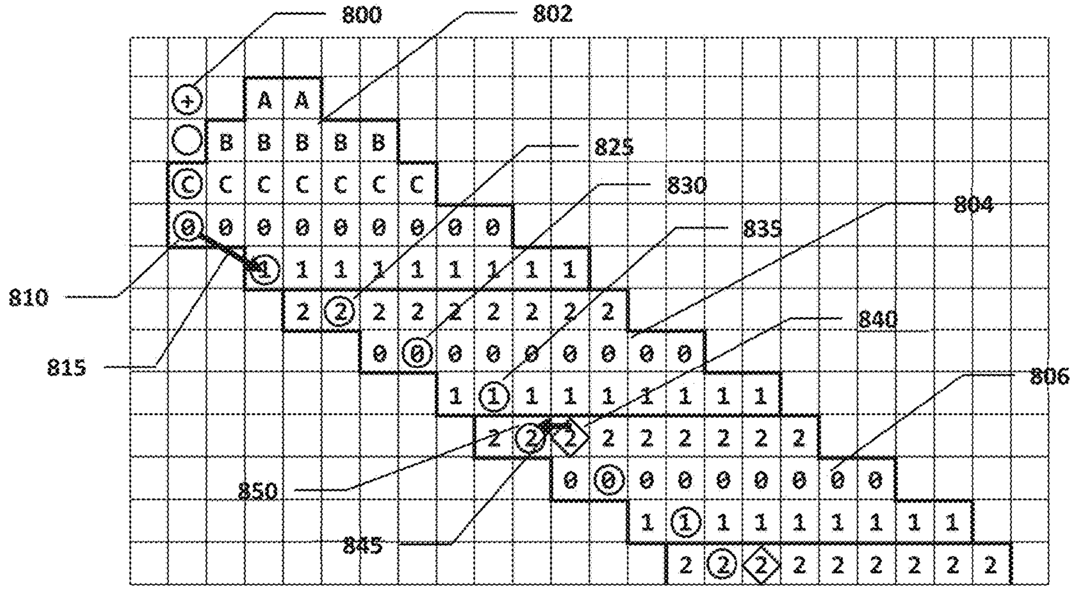
FIG. 8 illustrates an alternative exemplary prefetch plan for the slope 3/5 projection line.

With the alternative exemplary prefetch plan of FIG. 8, the initialization phase prefetches the five initial rows 802, and the cyclic phase prefetches first row cycle 804, second row cycle 806, and a suitable number subsequent row phases not shown.

The initialization phase begins by prefetching partial rows A, B, and C in the same manner as the exemplary prefetch plan of FIG. 7, using partial row information 860, which is identical to partial row information 750. The row address starts at grid location 800, and advances by the row pitch as shown for each row by a circle inside a grid location. After the partial rows have been prefetched the row address is at grid position 810.

The initialization phase continues by prefetching 2 extra advance rows, phase 0 and phase 1 inside initial rows 802 as shown. The number of extra advance rows is given in active cyclic row information 880, and can be adjusted as desired. The extra advance rows are prefetched using the same procedure as the cyclic rows of FIG. 7, except that no coordinated pixel processing operations are used, and row offsets are taken from base cyclic row information 870. After each such row, the row address is updated by cyclic row update amount 815, which as before can be the sum of the row pitch and the xRowUpdate amount given in prefetch plan parameters 890. If the extra advance rows cross a cycle boundary from phase 2 to phase 0 (which does not happen in this example), the xCycleAdjust value in prefetch plan parameters 890 is used as before. After the initialization phase the row address ends up at grid position 825 and the cyclic phase begins.

It is desirable that the cyclic phase proceeds the same way regardless of how the extra advance amount is adjusted, i.e. in the same way as for FIG. 7. Cyclic phase rows are prefetched and the row address is updated, moving from grid position 825 to grid positions 830, 835, and 840 at the end of first cycle 804. As before, at the end of each cycle the row address is adjusted by xCycleAdjust 845, whose value is given in prefetch plan parameters 890. Prefetch operations can be coordinated with pixel processing operations as before.

Since in this example the extra advance amount is not a multiple of the row period $\Delta y$, the cyclic phase starts at row phase 2 and each cycle of the cyclic phase prefetches row phases in the order 2, 0, and 1, not 0, 1, and 2. The row offsets in base cyclic row information 870 may not be correct and can be adjusted to produce the offsets in active cyclic row information 880. The offsets for row phases greater than or equal to the extra advance amount, row phase 2 in this example, need not be adjusted. For row phases less than the extra advance amount, the offsets in base cyclic row information 870 can be adjusted by adding xCycleAdjust to each offset, to produce the offsets in active cyclic row information 880. As can be seen in FIG. 8, the adjusted offsets correctly identify the positions of the first and last pixel of each row relative to the row addresses.

Figure 9:
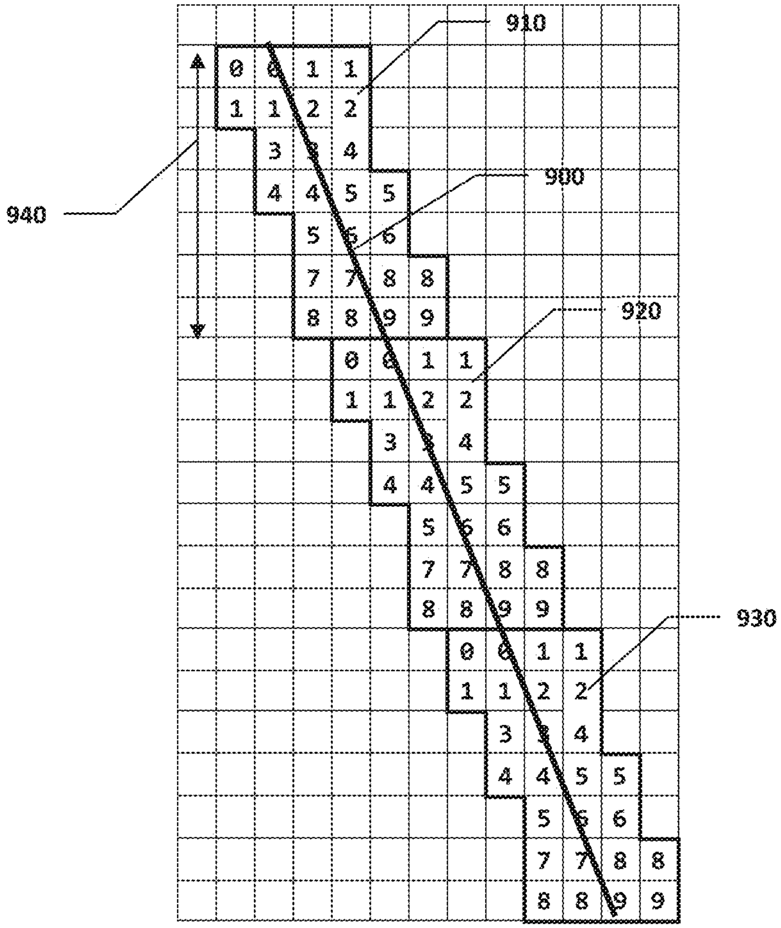
FIG. 9 illustrates an exemplary pixel processing plan according to a signal extraction method, showing a slope 7/3 projection line, a sequence of modules, and an illustrative pixel access order for signal extraction.

FIG. 9 shows an exemplary pixel processing plan, for projection line 900 of orientation characterized by slope $\Delta y/\Delta x=7/3$, approximately 66.8° from horizontal. Shown are first module cycle 910, second module cycle 920, third module cycle 930, and module height 940 (h=7).

Figure 10:
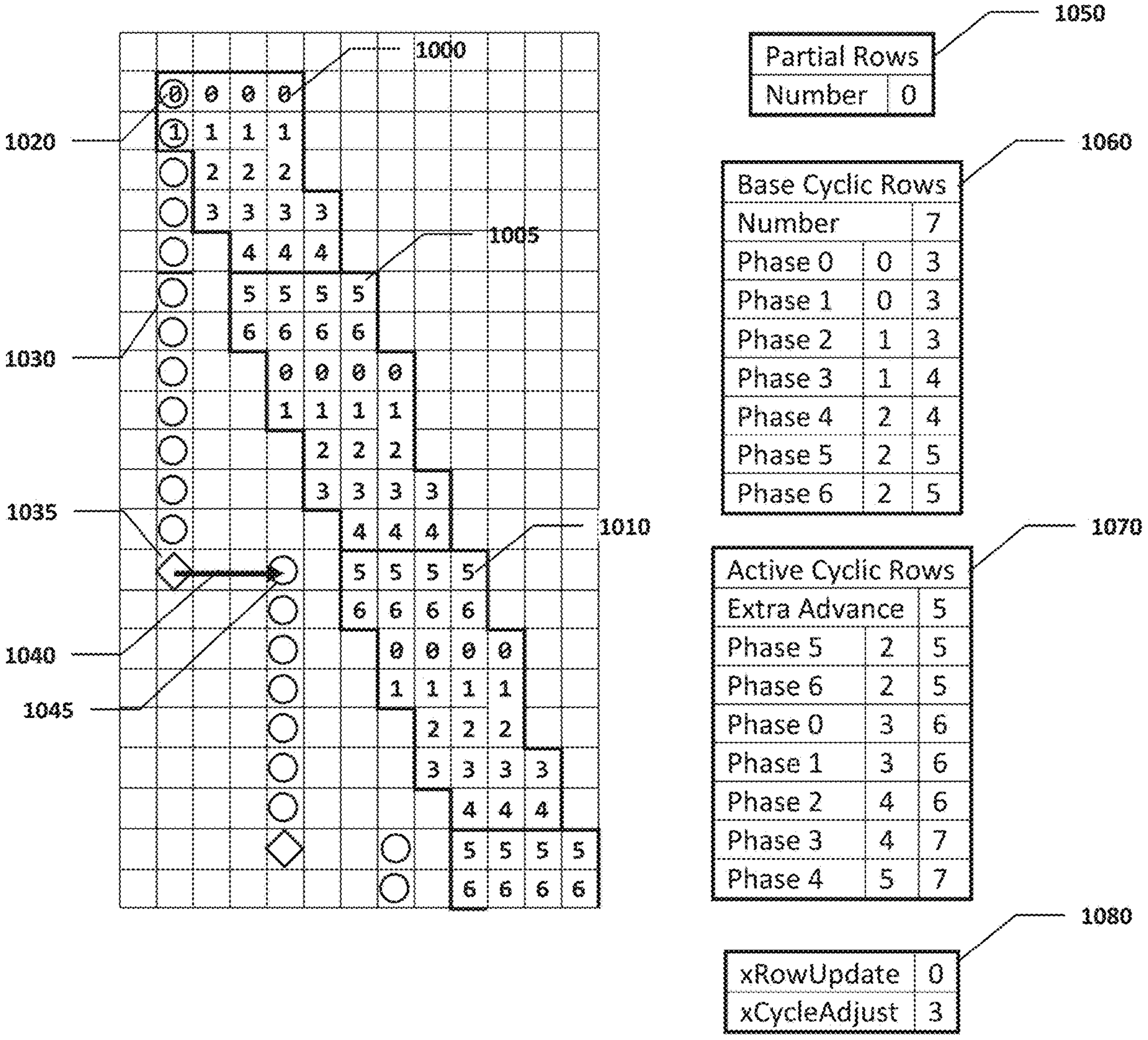
FIG. 10 illustrates an exemplary prefetch plan for the slope 7/3 projection line.

FIG. 10 shows an exemplary off-horizontal prefetch plan that can be used in coordination with the pixel processing plan of FIG. 9. FIG. 10 is useful to further illustrate how prefetch plans can be created and used, and comparison with FIGS. 7 and 8 can help illuminate the ways in which prefetch plans can be responsive to projection line orientation.

In the example of FIG. 10, $h-\Delta y=0$ and so there are no partial rows, as indicated in partial row information 1050. With xRowUpdate=0, equation 1 gives xCycleAdjust 1040 as simply $\Delta x=3$, both as given in prefetch plan parameters 1080.

Base cyclic row information 1060 shows that there are $\Delta y=7$ row phases, with first and last pixel offsets as shown. Since xRowUpdate is 0, these base cyclic row offsets are relative to row address that update in y only, as illustrated by the grid positions containing circles. For example, the phase 5 offsets 2 and 5 are relative to grid position 1030.

Since in this example there are no partial rows, the initialization phase of the prefetch plan prefetches just the 5 initial rows 1000. The row address starts at grid position 1020 and updates to grid position 1030 at the end of the initialization phase. First and last pixel offsets for initial rows 1000 are taken from base cyclic row information 1060.

The cyclic phase of the exemplary prefetch plan of FIG. 10 prefetches first row cycle 1005, second row cycle 1010, and a suitable number of subsequent row phases not shown. At the end of first row cycle 1005 the row address will be at grid position 1035, and is moved to grid position 1045 using row update amount 1040.

Phases 5 and 6 are greater than or equal to the extra advance amount, so their row offsets in active cyclic row information 1070 are the same as those in base cyclic row information 1060. Phases 0-4 are less than the extra advance amount, so their row offsets in active cyclic row information 1070 are adjusted by adding xCycleAdjust to the corresponding offsets in base cyclic row information 1060. Looking at the rows of first row cycle 1005 and second row cycle 1010 relative to the circled grid locations, it can be seen that the adjusted row offsets correctly locate the first and last pixel of each row.

Figure 11:
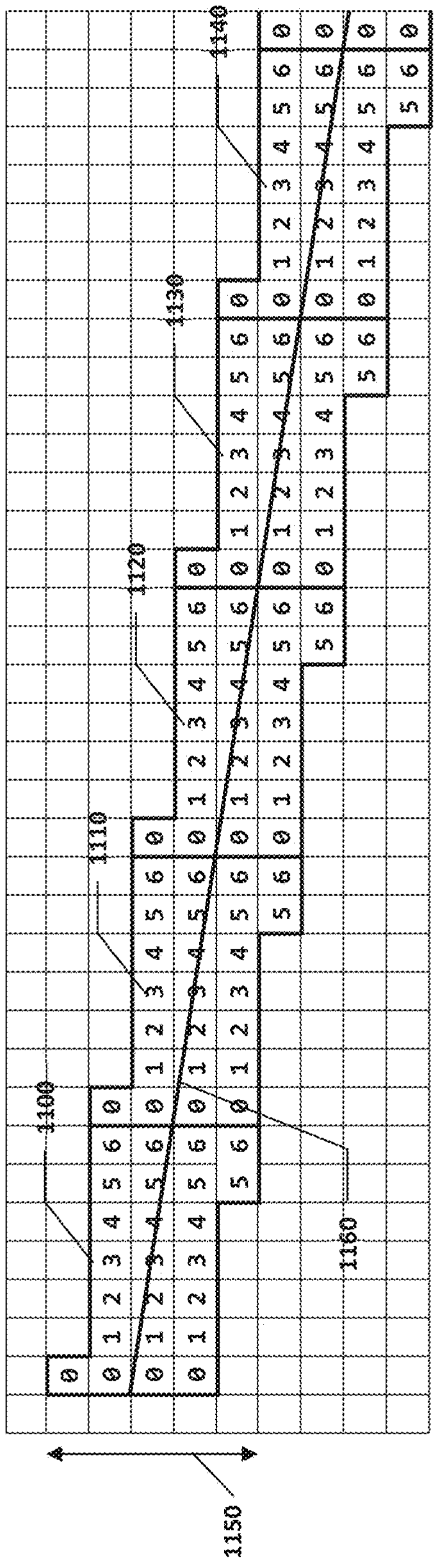
FIG. 11 illustrates an exemplary pixel processing plan according to a signal extraction method, showing a slope 1/7 projection line, a sequence of modules, and an illustrative pixel access order for signal extraction.

FIG. 11 shows an exemplary pixel processing plan, for projection line 1160 of orientation characterized by slope $\Delta y/\Delta x=1/7$, approximately 8.1° from horizontal. Shown are first module cycle 1100, second module cycle 1110, third module cycle 1120, fourth module cycle 1130, fifth module cycle 1140, and module height 1150 (h=5).

Figure 12:
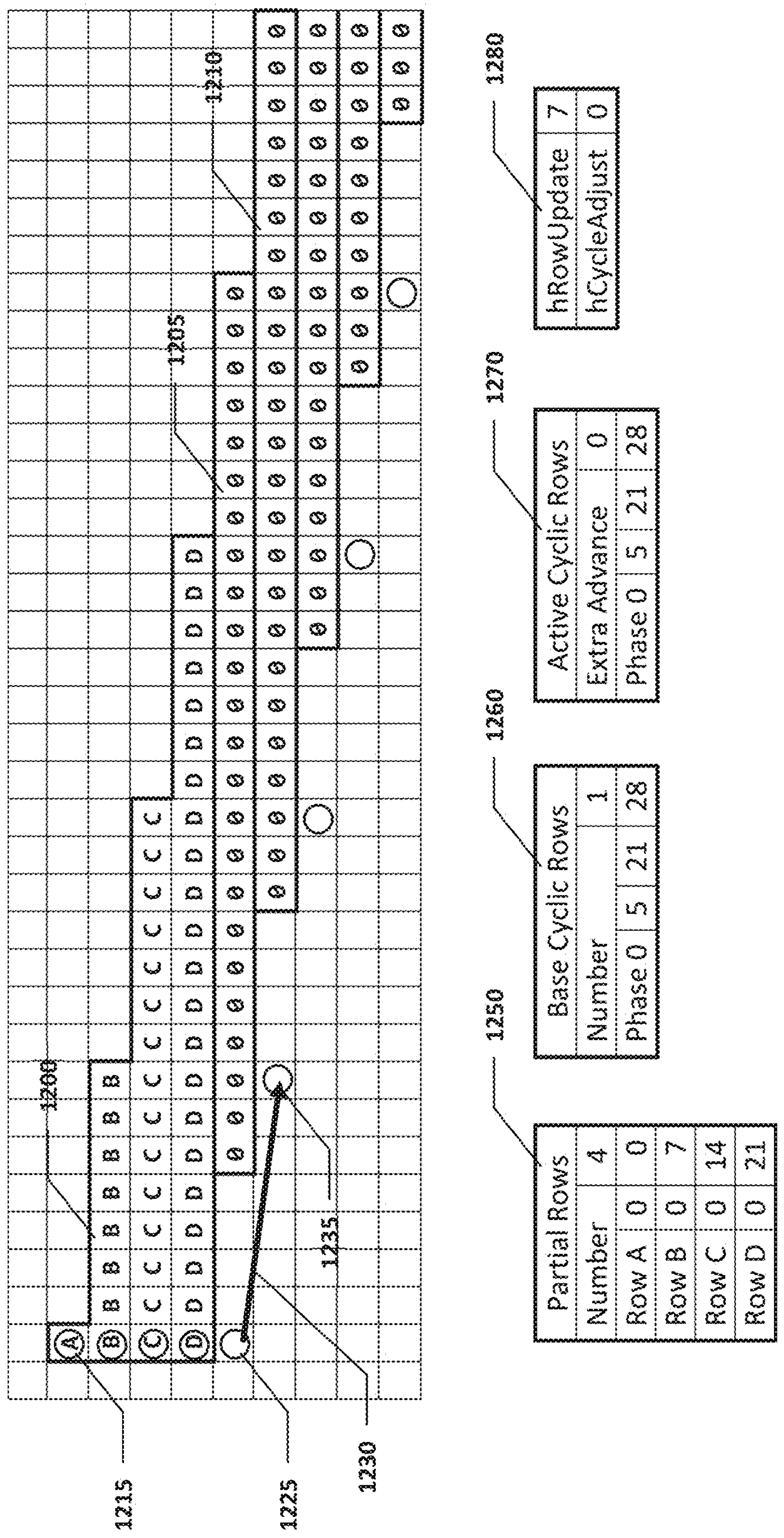
FIG. 12 illustrates an exemplary near-horizontal prefetch plan for the slope 1/7 projection line.

FIG. 12 shows an exemplary near-horizontal prefetch plan that can be used in coordination with the pixel processing plan of FIG. 11. FIG. 12 is useful to further illustrate how prefetch plans can be created and used, and comparison with previous figures can help illuminate the ways in which prefetch plans can be responsive to projection line orientation.

In the example of FIG. 12, $h-\Delta y=4$ and so there are 4 partial rows 1200, as given in partial row information 1250. With xRowUpdate at 7, equation 1 gives xCycleAdjust 0, both as given in prefetch plan parameters 1280. Since xCycleAdjust is 0, it is not shown on the grid.

During the cyclic phase of the prefetch plan, cyclic row update 1230 is used, for example to update the row address from grid position 1225 to grid position 1235. The row period $\Delta y=1$, so the cyclic phase has only phase 0 rows. First row cycle 1205 and second row cycle 1210 are shown, with subsequent row cycles extending beyond the portion of the image represented by the illustrated grid.

In the prefetch plan of FIG. 12, an exemplary cache line size of 16 is assumed. This is generally smaller than would be typical for contemporary devices and is chosen for simplicity of illustration. It can be seen that partial row D contains 22 pixels, and each complete cyclic row phase 0 contains 24 pixels, both larger than the assumed cache line size plus one, making this a near-horizontal orientation. The exemplary off-horizontal strategy of prefetching at the address of the first and last pixel of each row may not guarantee that all cache lines containing some portion of the row will be prefetched.

In some embodiments the exemplary row prefetch strategy of FIG. 5 is used for both partial rows and cyclic rows. In some embodiments the off-horizontal strategy is used for all rows, which can be a tradeoff between the cost of the loop control logic of FIG. 5 and the cost of possibly failing to prefetch one or more cache lines that contain a portion of the row.

In some embodiments different strategies can be used for partial and complete cyclic rows. For example, the off-horizontal strategy can be used for partial rows 1200, and a different strategy for cyclic rows. Since there are generally few partial rows, and partial rows are generally smaller than cyclic rows, it may not matter much which strategy is used for them. In some embodiments the off-horizontal strategy is used for partial rows and a different strategy, for example the strategy of FIG. 5, is used for cyclic rows.

The exemplary off-horizontal strategy using only two prefetch operations can be generalized to other fixed numbers of operations. For example, with three prefetch operations it can be guaranteed that all cache lines containing some portion of the row will be prefetched, and none others, for row sizes up to twice the cache line size plus 1, with some of the operations possibly being unnecessary and ignored. In some embodiments such a strategy might more advantageous than using the loop control logic of FIG. 5.

The exemplary prefetch plan of FIG. 12 employs this three-operation strategy for the cyclic rows. Base cyclic row information 1260 and active cyclic row information 1270 provide the three pixel offsets. The first and third offset shown correspond to the first and last pixel of the cyclic rows. The second offset is equal to the first pixel offset plus the cache line size, or the last pixel offset, whichever is smaller.

For very long rows this three-operation strategy might fail to fetch some cache lines that contain some portion of the row. However, in many embodiments near-horizontal orientations are rare, and very long rows are even rarer.

FIG. 13 is an exemplary flowchart illustrating a procedure for using a pixel processing plan in coordination with a prefetch plan. Rectangle flowchart elements represent pixel operations, rounded rectangle flowchart elements represent prefetch operations, and other flowchart elements correspond to control flow. Initialization phase 1300 and cyclic phase 1310 are shown, both as previously described.

Module cycle loop 1320 iterates over each module cycle (i.e. position) along the projection line. For each module cycle, nested slice loop 1330 iterates over each slice in the current module cycle. For each slice, pixel processing step 1340 performs pixel operations of the slice as directed by the pixel processing plan. Pixel processing step 1340 can also compute a portion of the 1D signal to be extracted. Further for each slice, if conditional 1350 determines that the slice number is less than the row period, then prefetch step 1360 performs prefetch operations to prefetch the next cyclic row.

A variety of modifications can be made to the flowchart by a person of ordinary skill, to satisfy a variety of purposes. If for given pixel processing and prefetch plans the row period is greater than the module period, slice loop 1330 can be replaced with a row loop, with appropriate changes to conditional 1350. Alternatively, the loop structure can be changed such that the relationship between the module and row period doesn't matter.

For better control of projection line length, the flowchart can be modified in various obvious ways for a partial last module. Prefetch operations can be done before pixel processing operations in slice loop 1330.

For simplicity of illustration, the flowchart does not show various loop initialization and update steps, including row address initialization and update, which are described in detail above. Filling in such details can be done by a person of ordinary skill.

As described above in reference to FIGS. 7, 8, 10, and 12, the use of the extra advance value provides a means to control prefetch distance, independently for each prefetch plan and responsive to the orientation of the projection line.

Various procedures can be used to choose suitable values for extra advance. It is desirable that prefetch distance for each prefetch plan be large enough that pixels have had time to be brought into data cache 210, but not so large that those pixels may be evicted before use. Clearly prefetch distance does not need to be chosen to high precision to be effective, but some reasonable value should be used.

Figure 14:
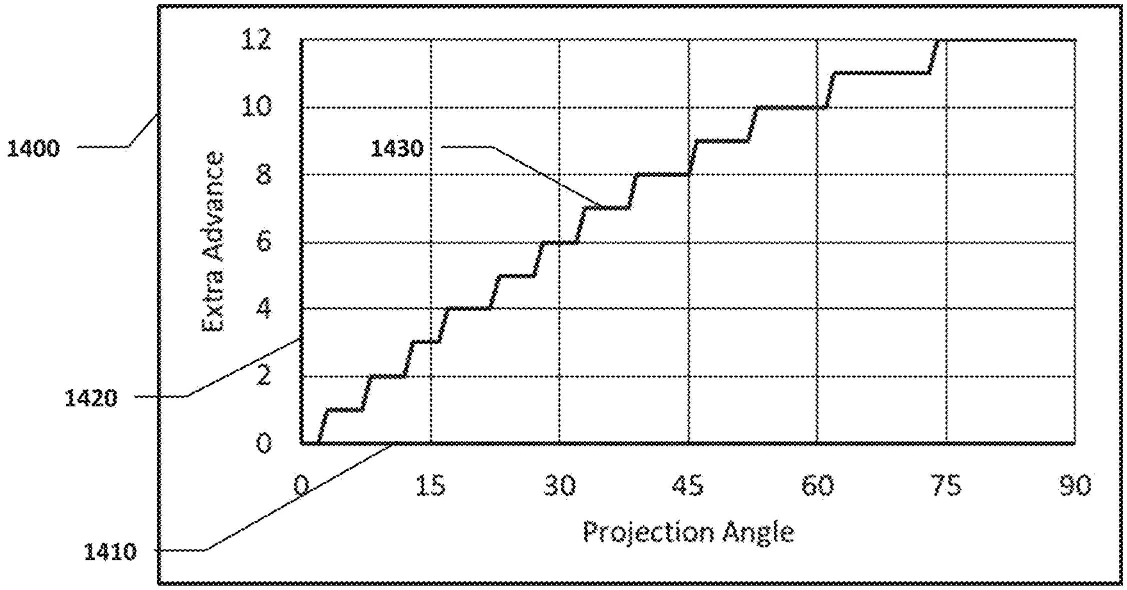
FIG. 14 illustrates a graph showing an exemplary method for choosing prefetch distance responsive to projection orientation.

In the exemplary embodiment of FIG. 14, extra advance is chosen by a parametric formula. FIG. 14 shows a graph 1400 of extra advance 1420 as a function 1430 of projection line angle 1410, in degrees from 0 to 90. The formula for this example is $$\text{extra advance} = \text{round}[V\sin(\theta)] \tag{2}$$

where θ is projection line angle 1410 and V is a parameter, V=12 in this example.

Equation 2 is based on the observation that projection orientations closer to vertical tend to fetch new pixels at a higher rate than those closer to horizontal, because the more vertical orientations tend to have smaller prefetch rows and more of them per module cycle. Those new pixels will be needed sooner by the pixel processing plan, and so extra advance should be higher.

The V parameter of equation 2 can be responsive to details of processor 200, memory hierarchy 270, projection line orientation zones, or any suitable characteristic of a particular embodiment.

In an alternative exemplary embodiment, for each projection line orientation the pixel processing plan and prefetch plan are analyzed in detail to determine the extra advance value that leads to a given effective prefetch distance, measured in computational steps such as pixel processing and prefetch operations, rather than row phases that extra advance directly controls. The value so obtained can be stored in table memory 280 with the prefetch plan.

In yet another alternative exemplary embodiment, the extra advance value for each projection line orientation can be determined by measuring execution time on a given system. With this embodiment, various values of extra advance can be tried, choosing one with small execution time, possibly combined with other desirable characteristics.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present disclosure. The non-transitory computer-readable medium or media may be transportable, such that the program or programs stored thereon may be loaded onto any computer resource to implement various aspects of the present disclosure as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion among different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments in detail, various modifications and improvements will readily occur to those skilled in the art. Such modifications and improvements are intended to be within the spirit and scope of the disclosure. Accordingly, the foregoing description is by way of example only, and is not intended as limiting.

Various aspects are described in this disclosure, which include, but are not limited to, the following aspects:

1. A method for extracting from a two-dimensional image a one-dimensional signal along a projection line, comprising: accessing the two-dimensional image, which comprises pixels arranged on a pixel grid; storing the two-dimensional image using a memory hierarchy comprising a main store and a data cache, wherein non-blocking prefetch operations are configured to fetch pixels from the main store to the data cache; receiving information describing the projection line, the information including an orientation of the projection line, wherein the orientation is one of a set of allowable orientations, the set of allowable orientations including orientations that are not parallel to the pixel grid and are not diagonal to the pixel grid; selecting, responsive to the orientation, a prefetch plan specifying a sequence of prefetch operations in a first address order, the sequence of prefetch operations comprising a sequence of rows; selecting, responsive to the orientation, a pixel processing plan specifying a sequence of pixel operations in a second address order that is distinct from the first address order; selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

2. The method of aspect 1 or any other aspect, wherein at least one of the prefetch plan, the pixel processing plan, or the prefetch distance are precomputed and stored in a table memory.

3. The method of aspect 1 or aspect 2 or any other aspect, wherein the pixel processing plan specifies a repeating sequence of pixel weight templates.

4. The method of any one of aspects 1-3 or any other aspect, wherein the prefetch plan comprises a first phase for initialization and a second phase performed cyclically.

5. The method of aspect 4 or any other aspect, wherein the first phase specifies prefetching a partial row.

6. The method of aspect 4 or any other aspect, wherein the second phase specifies prefetching a complete row.

7. The method of any one of aspects 1-6 or any other aspect, wherein the prefetch distance is a parametric function of the orientation.

8. The method of any one of aspects 1-7 or any other aspect, wherein the prefetch distance is determined by measuring execution time of the pixel processing plan.

9. The method of any one of aspects 1-8 or any other aspect, wherein the prefetch plan for a plurality of allowable orientations specifies prefetching only the first and last pixels of each row.

10. The method of aspect 9 or any other aspect, wherein the prefetch plan for near-horizontal orientations specifies prefetching three pixels of each row.

11. The method of aspect 9 or any other aspect, wherein the prefetch plan for near-horizontal orientations specifies prefetching exactly three pixels of each row.

12. An electronic apparatus for extracting from a two-dimensional image a one-dimensional signal along a projection line, the apparatus comprising: a memory hierarchy comprising a main store and a data cache, wherein the two-dimensional image comprises pixels arranged on a pixel grid and is stored in the memory hierarchy, and the pixels of the two-dimensional image are fetched from the main store to the data cache by non-blocking prefetch operations; and at least one processor configured to execute computer executable instructions to, wherein the computer executable instructions comprise instructions for: receiving information describing the projection line, the information including an orientation of the projection line, wherein the orientation is one of a set of allowable orientations, the set of allowable orientations including orientations that are not parallel to the pixel grid and are not diagonal to the pixel grid; selecting, responsive to the orientation, a prefetch plan specifying a sequence of prefetch operations in a first address order, the sequence of prefetch operations comprising a sequence of rows; selecting, responsive to the orientation, a pixel processing plan specifying a sequence of pixel operations in a second address order that is distinct from the first address order; selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

13. The method of aspect 12 or any other aspect, wherein at least one of the prefetch plan, the pixel processing plan, or the prefetch distance are precomputed and stored in a table memory.

14. The apparatus of aspect 12 or aspect 13 or any other aspect, wherein the pixel processing plan specifies a repeating sequence of pixel weight templates.

15. The apparatus of any one of aspects 12-14 or any other aspect, wherein the prefetch plan comprises a first phase for initialization and a second phase performed cyclically.

16. The apparatus of aspect 15 or any other aspect, wherein the first phase specifies prefetching a partial row.

17. The apparatus of aspect 15 or any other aspect, wherein the second phase specifies prefetching a complete row.

18. The apparatus of any one of aspects 12-17 or any other aspect, wherein the prefetch distance is a parametric function of the orientation.

19. The apparatus of any one of aspects 12-18 or any other aspect, wherein the prefetch distance is determined by measuring execution time of the pixel processing plan.

20. The apparatus of any one of aspects 12-19 or any other aspect, wherein the prefetch plan for a plurality of allowable orientations specifies prefetching only the first and last pixels of each row.

21. The method of aspect 20 or any other aspect, wherein the prefetch plan for near-horizontal orientations specifies prefetching three pixels of each row.

22. The method of aspect 20 or any other aspect, wherein the prefetch plan for near-horizontal orientations specifies prefetching exactly three pixels of each row.

23. A non-transitory computer-readable medium storing computer executable instructions configured to, when executed by at least one processor, perform a method for extracting from a two-dimensional image a one-dimensional signal along a projection line, the method comprising: accessing the two-dimensional image, which comprises pixels arranged on a pixel grid; storing the two-dimensional image using a memory hierarchy comprising a main store and a data cache, wherein non-blocking prefetch operations are configured to fetch pixels from the main store to the data cache; receiving information describing the projection line, the information including an orientation of the projection line, wherein the orientation is one of a set of allowable orientations, the set of allowable orientations including orientations that are not parallel to the pixel grid and are not diagonal to the pixel grid; selecting, responsive to the orientation, a prefetch plan specifying a sequence of prefetch operations in a first address order, the sequence of prefetch operations comprising a sequence of rows; selecting, responsive to the orientation, a pixel processing plan specifying a sequence of pixel operations in a second address order that is distinct from the first address order; selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

The invention claimed is:

1. A method for extracting from a two-dimensional image a one-dimensional signal along a projection line, comprising:

receiving the two-dimensional image, which comprises pixels arranged on a pixel grid;

storing the two-dimensional image using a memory hierarchy comprising a main store and a data cache, wherein non-blocking prefetch operations are configured to fetch pixels from the main store to the data cache;

receiving information describing the projection line, the information including an orientation of the projection line, wherein the orientation is one of a set of allowable orientations, the set of allowable orientations including orientations that are not parallel to the pixel grid and are not diagonal to the pixel grid;

selecting, responsive to the orientation, a prefetch plan specifying a sequence of prefetch operations in a first address order, the sequence of prefetch operations comprising a sequence of rows;

selecting, responsive to the orientation, a pixel processing plan specifying a sequence of pixel operations in a second address order that is distinct from the first address order, wherein the pixel processing plan specifies a repeating sequence of pixel weight templates and a sequence of relative positions;

selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

2. The method of claim 1, wherein at least one of the prefetch plan, the pixel processing plan, or the prefetch distance are precomputed and stored in a table memory.

3. The method of claim 1, wherein the prefetch plan comprises a first phase for initialization and a second phase performed cyclically.

4. The method of claim 3, wherein the first phase specifies prefetching a partial row.

5. The method of claim 3, wherein the second phase specifies prefetching a complete row.

6. The method of claim 1, wherein the prefetch distance is a parametric function of the orientation.

7. The method of claim 1, wherein the prefetch distance is determined by measuring an execution time of the pixel processing plan.

8. The method of claim 1, wherein the prefetch plan for a plurality of allowable orientations specifies prefetching only a first and a last pixel of each row.

9. The method of claim 8, wherein the prefetch plan for near-horizontal orientations specifies prefetching three pixels of each row.

10. The method of claim 8, wherein the prefetch plan for near-horizontal orientations specifies prefetching exactly three pixels of each row.

11. An electronic apparatus for extracting from a two-dimensional image a one-dimensional signal along a projection line, the apparatus comprising:

a memory hierarchy comprising a main store and a data cache, wherein the two-dimensional image comprises pixels arranged on a pixel grid and is stored in the memory hierarchy, and the pixels of the two-dimensional image are fetched from the main store to the data cache by non-blocking prefetch operations; and at least one processor configured to execute computer executable instructions to, wherein the computer executable instructions comprise instructions for:

receiving information describing the projection line, the information including an orientation of the projection line, wherein the orientation is one of a set of allowable orientations, the set of allowable orientations including orientations that are not parallel to the pixel grid and are not diagonal to the pixel grid;

selecting, responsive to the orientation, a prefetch plan specifying a sequence of prefetch operations in a first address order, the sequence of prefetch operations comprising a sequence of rows;

selecting, responsive to the orientation, a pixel processing plan specifying a sequence of pixel operations in a second address order that is distinct from the first address order, wherein the pixel processing plan specifies a repeating sequence of pixel weight templates and a sequence of relative positions;

selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

12. The apparatus of claim 11, wherein the prefetch plan comprises a first phase for initialization and a second phase performed cyclically.

13. The apparatus of claim 12, wherein the first phase specifies prefetching a partial row.

14. The apparatus of claim 12, wherein the second phase specifies prefetching a complete row.

15. The apparatus of claim 11, wherein the prefetch distance is a parametric function of the orientation.

16. The apparatus of claim 11, wherein the prefetch distance is determined by measuring an execution time of the pixel processing plan.

17. The apparatus of claim 11, wherein the prefetch plan for a plurality of allowable orientations specifies prefetching only a first and a last pixel of each row.

18. A non-transitory computer-readable medium storing computer executable instructions configured to, when executed by at least one processor, perform a method for extracting from a two-dimensional image a one-dimensional signal along a projection line, the method comprising:

accessing the two-dimensional image, which comprises pixels arranged on a pixel grid;

storing the two-dimensional image using a memory hierarchy comprising a main store and a data cache, wherein non-blocking prefetch operations are configured to fetch pixels from the main store to the data cache;

receiving information describing the projection line, the information including an orientation of the projection line, wherein the orientation is one of a set of allowable orientations, the set of allowable orientations including orientations that are not parallel to the pixel grid and are not diagonal to the pixel grid;

selecting, responsive to the orientation, a prefetch plan specifying a sequence of prefetch operations in a first address order, the sequence of prefetch operations comprising a sequence of rows;

selecting, responsive to the orientation, a pixel processing plan specifying a sequence of pixel operations in a second address order that is distinct from the first address order, wherein the pixel processing plan specifies a repeating sequence of pixel weight templates and a sequence of relative positions;

selecting, responsive to the orientation, a prefetch distance; and using the pixel processing plan in coordination with the prefetch plan to compute the one-dimensional signal, comprising executing the sequence of prefetch operations to fetch pixels from the main store to the data cache in advance of being used by the sequence of pixel operations by an amount of time that is responsive to the prefetch distance.

19. The non-transitory computer-readable medium of claim 18, wherein the prefetch plan comprises a first phase for initialization and a second phase performed cyclically.

20. The non-transitory computer-readable medium of claim 19, wherein:

the first phase specifies prefetching a partial row; and the second phase specifies prefetching a complete row.

* * * * *